United States Patent [19]

Lukas et al.

[11] 3,860,810
[45] Jan. 14, 1975

[54] MULTIPLE FLASHLAMP UNIT

[75] Inventors: Josef Lukas; Dietmar Illig, both of Augsburg, Germany

[73] Assignee: Patent-Treuhand-Gesellschaft fur elektrische Gluhlampen mbH, Munich, Germany

[22] Filed: Aug. 21, 1973

[21] Appl. No.: 390,280

[30] Foreign Application Priority Data
Aug. 29, 1972 Germany............................ 2242436

[52] U.S. Cl................................. 240/1.3, 264/249
[51] Int. Cl. .......................................... G03b 15/02
[58] Field of Search ...... 240/1.3; 95/11 L; D61/1 F; 264/249; 354/126, 143; 431/93, 95

[56] References Cited
UNITED STATES PATENTS

| | | |
|---|---|---|
| 3,508,040 | 4/1970 | Bertrams et al. .................... 240/1.3 |
| 3,513,304 | 5/1970 | Ott...................................... 240/1.3 |
| 3,518,417 | 6/1970 | Bertrams............................. 240/1.3 |
| 3,725,692 | 4/1973 | Miller et al. ........................ 240/1.3 |

Primary Examiner—Fred L. Braun
Attorney, Agent, or Firm—D. S. Buleza

[57] ABSTRACT

The plastic base and light-transmitting cover components of a multi-lamp photographic flash unit are fastened to each other by locally heating selected portions of the plastic in the junction area and thereby hot welding and bonding the components together. The localized heating is achieved with a heated tool of V or M-shaped configuration that is pressed against one (or both) of the plastic components and thus forms at least one notch that extends along the welds. The base and cover components are thus securely joined together without the use of ultrasonic energy which could accidently trigger and fire the flashlamps, particularly those of the mechanically ignitable type.

6 Claims, 9 Drawing Figures

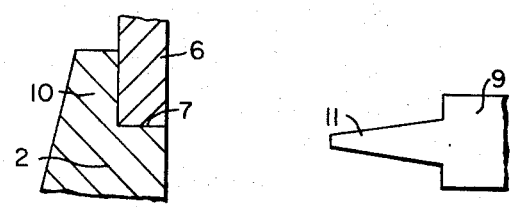
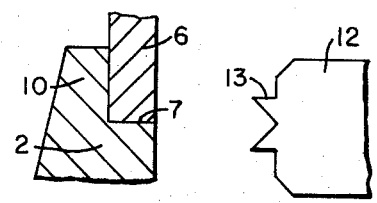
FIG. 3a  FIG. 4a
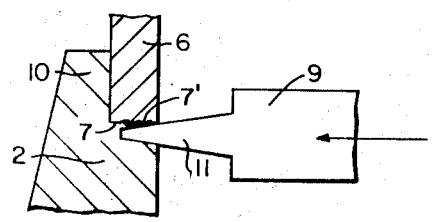
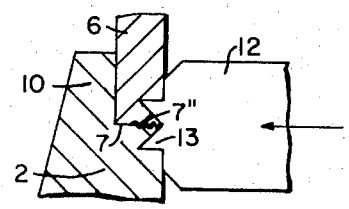
FIG. 3b  FIG. 4b
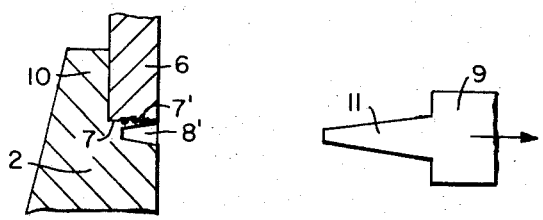
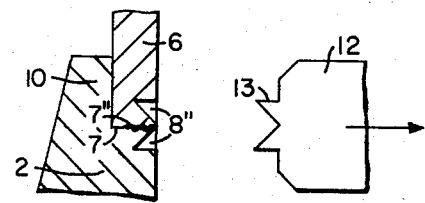
FIG. 3c  FIG. 4c
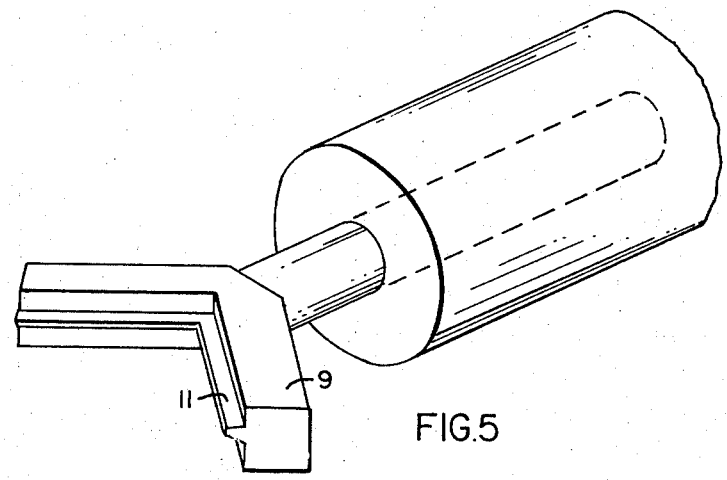
FIG. 5

MULTIPLE FLASHLAMP UNIT

BACKGROUND OF THE INVENTION

This invention relates to a photographic flashlamp unit that contains a plurality of flashlamps and to a method of bonding the cover to the base component of such a unit.

2. Description of the Prior Art

Photographic flash units which contain a plurality of photoflash lamps that are selectively ignited are well known in the art. Such flashlamp units have a holder that serves as a base component and is generally of rectangular shape. This holder is made of plastic material and has an integrally formed jack or post that permits the unit to be inserted into the socket of a camera, which is adapted to the unit, or into an adaptor. The flashlamp unit contains four electrically or mechanically ignitable photoflash lamps (which are affixed to the base member) and a reflector body that defines four reflectors that are associated with the respective lamps. A rectangularly shaped protective cube of light-transmissive plastic material encloses the lamp-reflector assembly and serves as a cover. In the prior art, this cover was firmly welded to the base component in the areas of junction by means of ultrasonic techniques.

During the process of welding by ultrasonic techniques, oscillations are sometimes transmitted to the lamps of the flashlamp unit and cause the lamps to fire, especially where mechanically ignitable lamps are used. When this happens, the fired photoflash lamps have to be replaced and the process of assembling the units is interrupted.

SUMMARY OF THE INVENTION

The foregoing problems are avoided in accordance with the invention by joining the protective cover to the base component by a hot welding process instead of by the ultrasonic techniques employed previously. This is achieved by a tool that is heated to a high temperature and is pressed against the multiple flashlamp unit in the areas of junction. The tool preferably comprises a hot-press key of, for instance, V or M-profile. The heat transmitted from the hot-press key to the plastic components in the area of juncture forms the desired weld. After removal of the hot-press key and cooling off of the weld there remains a profile impression of the key adjacent to the weld in the base member and/or in the protective cover of the multiple flashlamp unit. As a result, a notch (or notches) extends along each of the hot welds in the areas of juncture.

The protective plastic cover is thus securely bonded to the plastic base component of the multiflash unit in a very simple and economical manner without vibrating or accidently firing any of the lamps.

BRIEF DESCRIPTION OF THE DRAWINGS

A better understanding of the invention will be obtained from the exemplary embodiments, shown in the accompanying drawings, wherein:

FIGS. 3a – 3c are views showing the various steps in the hot welding process used in making the multiple flashlamp unit illustrated in FIG. 1;

FIGS. 4a – 4c is a similar series of views showing the processing steps in the manufacture of the multiple flashlamp unit illustratd in FIG. 2; and FIG. 5 is a perspective view of a tool used in the production of the multiple flashlamp unit according to the invention as illustrated in FIG. 1.

DESCRIPTION OF THE PREFERRED EMBODIMENTS

Figure 1:
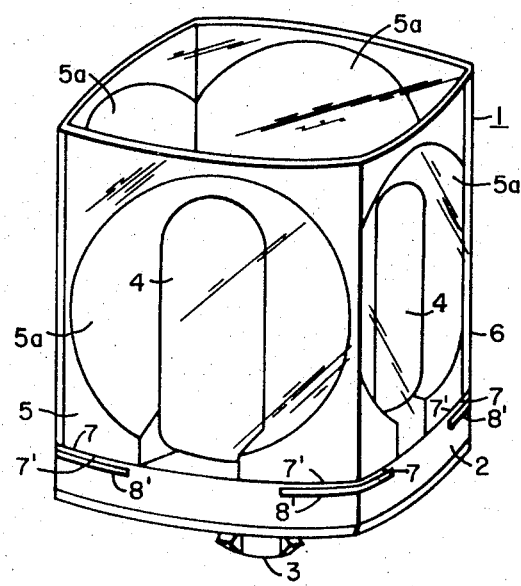
FIG. 1 is a pictorial view of a multiple flashlamp unit according to the invention.

A multiple flashlamp unit 1 embodying the invention is shown in FIG. 1. As will be noted, the unit has a suitable holder such as a substantially rectangular base member 2 of plastic material having an integrally formed jack or post appendage 3 that permits the unit 1 to be inserted into the socket of a camera (or of an adaptor) which is designed to receive the unit. Four electrically or mechanically ignitable photoflash lamps 4 are affixed to the base component 2 and a reflector body 5 forming four reflectors 5a is provided which is fashioned from a foil strip or manufactured as an integral member by injection-molding techniques. A rectangularly shaped cubical cover 6 of transparent plastic material protectively encloses the photoflash lamps 4 and the reflector body 5. The protective light-transmissive cover 6 is hot welded to the base component 2 in several areas of juncture 7, that is, along several locations adjacent the region where the cover 6 and base component 2 abut and seat against one another when placed in assembled relationship. A notch 8' is associated with and extends along each of the welds 7'. This notch 8' can be located in the base member 2 or the cover 6.

In FIG. 1 the notches 8' associated with the welds 7' are located in the rim of the base component 2 and extend around the corners of the cubical flash unit 1 so that two adjoining sides of the unit share a notch 8' at the edge which is common to both. Alternatively, the welds and notches can also be confined entirely to one side of the multiflash unit 1 and be spaced from the corners of the unit.

Figure 2:
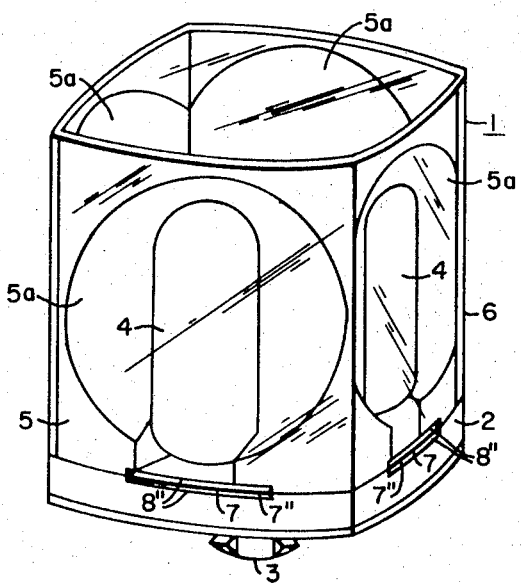
FIG. 2 is a similar view of an alternative embodiment.

The aforesaid alternative arrrangement is shown iin FIG. 2. As illustrated, the multiple flashlamp unit 1 in this embodiment has four welds 7″ each of which extend along only one side of the unit and are spaced from the respective corners. In addition, the hot welding is done in such a way that each weld 7″ has two adjoining notches 8″ associated therewith, one notch 8″ extending along the base component 2 and the other notch 8″ extending along the proximate edge of the cover 6.

It is also possible to construct a multiple flashlamp unit with a circumferential notch in the base component and/or the cover corresponding to a unique circumferential weld that extends around the entire periphery of the multiple flashlamp unit. When the cover and base component are, for instance, of cylindrical design, such a circumferential weld would be accomplished by a continuous circumferential notch.

The notches 8', 8″ are profile indentations or impressions of the profile of a suitable welding tool that is applied to the areas of juncture 7 to produce the welds 7', 7″. In the described embodiments this tool has a key shape. In order to produce the corner-spanning welds 7' of the multiple flashlamp unit 1 of FIG. 1, the welding tool 9 has, for example, an electrically heated hot-press key-like end portion 11 which is associated with a heating mandrel, said tool consisting for instance of steel, as shown in FIG. 5. This hot-press key portion 11 is of angular shape and has V-profile. After the key 11 is heated up to working temperature (generally a temperature of about 160°–220°C is sufficient when the cover 6 and the base member 2, usually both consisting of polystyrene, are to be effectively joined by the welding) the tool 9 is directed towards the multiple flashlamp unit and the key 11 is pressed against the base member 2 (FIG. 3a) of the multiple flashlaamp unit (which is expediently provided with a shoulder 10 in the areas of juncture 7 where the welds are to be made so that the protective cover 6 fits the base member 2 in these places particularly closely) and the key 11 is even slightly impressed therein, as shown in FIG. 3b. The tool 9 and hotpress key 11 remain in this position of pressure (while being maintained at the desired working temperature) for about 0.3– 1.5 seconds, generally for 0.8 second. The heat transmitted from the hot-press key 11 to the area of juncture 7 forms a weld 7' which, after removal of the tool and hot-press key (FIG. 3c) and cooling off of the plastic, furnishes a firm and lasting bond between the cover 6 and the base member 2. The impression left in the plastic by the V-profile of the hot-press key 11 creates a notch 8' which is associated with and extends along the weld 7' in the base member 2. In order to obtain an intimate bond of the materials of the base and cover components in the welding area, both components are compressed together during the hot welding operation. By welding the cover to the base member in several areas of junction (for instance, welding the four areas of juncture 7 of the multiple flashlamp unit 1 of FIG. 1 which are in diagonally opposed position to one another or by applying the welds to all four sides of the unit as in FIG. 2), an all-round firm fit of the protective cover on the base member is achieved.

When the hot-press key which is utilized to weld the cover 6 to the base member 2 is provided with M-profile, the weld thus formed (after welding the base 2 to the cover 6) has two notches extending along the weld and a multiple flashlamp unit of the type shown in FIG. 2 is obtained. To form the four welds 7" of the multiple flashlamp unit 1 (FIG. 2), there is used for instance a tool 12 having a straight and approximately 10 mm wide hot-press key 13 with an M-profile (shown in FIG. 4a). This key is pressed in such a way against each of the areas of juncture 7 to be welded (FIG. 4b) that after forming of the weld 7", removal of the tool and its hot-press key portion and cooling off of the weld (FIG. 4c), there remains a notch 8" positioned roughly symmetrically to the weld 7" with a length of about 10 mm in the base member 2, and a notch 8" with a length of about 10 mm in the cover as the profile impression of the hot-press key 13. To insure a particularly firm fit of the cover 6 on the base member 2, there is again provided a shoulder 10 in the base member 2.

A welding tool with a key having an M-profile brings about a compression of the plastic material which promotes the welding in the area of the prospective weld. Welded joints which enclose the borders of a multiple flashlamp unit (as for example, the multiple flashlamp unit 1 of FIG. 1), are particularly strong and durable. When the cover and base of the multiple flashlamp unit have curved surfaces (of parabolical or elliptical shape etc.) as when a cylindrical cover for instance and a circular base member are to be joined by welding, it is advantageous to use for the forming of the welds a curved hot-press key provided with V or M-profile. Other key profiles can also be used for firmly bonding the cover and the base component of a multiple flashlamp unit by the hot welding process of this invention.

We claim as our invention:

1. In a multiple flashlamp unit having a plastic base component that has a plurality of photoflash lamps mounted thereon together with a reflector body that defines a corresponding number of reflectors which are operatively disposed relative to said lamps, the improvement comprising a protective cover component of light-transmissive plastic material that is disposed in enclosing relationship with said lamps and reflector body and is fastened to the plastic base component by at lest one weld which consists of abutted edge portions of said cover and base components that are heat-bonded to one another, said base component having an interiorly disposed shoulder thereon that is in tight-fitted relationship with the abutted and welded edge portion of said cover component, and said weld having at least one notch-like indentation associated therewith that extends along the outer surface of one of the heat-bonded edge portions of said plastic components and along the welded junction, said weld comprising the sole means holding the cover component in assembled relationship with said reflector body and base component.

2. The multiple flashlamp unit of claim 1 wherein said notch-like indentation is located in the outer surface of said base component.

3. The multiple flashlamp unit of claim 1 wherein said notch-like indentation is located in the outer surface of said cover component.

4. The multiple flashlamp unit of claim 1 wherein said weld has two notch-like indentations associated therewith, one of said indentations being located in the outer surface of said base component and the other of said indentations being located in the outer surface of the cover component.

5. The multiple flashlamp unit of claim 1 wherein;
said base component is of generally rctangular configuration, and has an integral post-like appendage,
said cover is of generally cubical configuration, and
the notch-like indentation is located in the rim of said base member and has a cross-sectional profile which is V-shaped.

6. The multiple flashlamp unit of claim 1 wherein;
said base component is of generally rectangular configuration and has an integral post-like appendage,
said cover is of generally cubical configuration, and
said weld has two notch-like indentations associated therewith, one of which is located in the exterior rim portion of said base component and the other of which is located in the exterior rim portion of said cover component,
said indentations being disposed on opposite sides of said weld and being so contoured that, together with the heat-bonded portions of said components, they define an indentation in the exterior surface of said flashlamp unit that has a cross-sectional profile which is M-shaped.

* * * * *